United States Patent
Lindsay

(10) Patent No.: US 10,195,620 B2
(45) Date of Patent: *Feb. 5, 2019

(54) SPRAY GUN APPARATUS

(71) Applicant: Jim Lindsay Ltd., Saltcoats (GB)

(72) Inventor: James Lindsay, Saltcoats (GB)

(73) Assignee: Jim Lindsay Ltd., Saltcoats (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/502,952

(22) PCT Filed: Aug. 12, 2015

(86) PCT No.: PCT/GB2015/052327
§ 371 (c)(1),
(2) Date: Feb. 9, 2017

(87) PCT Pub. No.: WO2016/024107
PCT Pub. Date: Feb. 18, 2016

(65) Prior Publication Data
US 2017/0232456 A1    Aug. 17, 2017

(30) Foreign Application Priority Data
Aug. 12, 2014 (GB) .................................. 1414281.4

(51) Int. Cl.
*B05B 7/06* (2006.01)
*B05B 7/08* (2006.01)
(Continued)

(52) U.S. Cl.
CPC ............ *B05B 7/0838* (2013.01); *B05B 7/068* (2013.01); *B05B 7/1209* (2013.01);
(Continued)

(58) Field of Classification Search
CPC ....... B05B 1/3046; B05B 7/066; B05B 7/068; B05B 7/0815; B05B 7/0838;
(Continued)

(56) References Cited

U.S. PATENT DOCUMENTS 1,475,372 A * 11/1923 Day ........................ B05B 7/068
239/301
1,797,209 A   3/1931 Bramsen et al.
(Continued)

FOREIGN PATENT DOCUMENTS

EP     0706832 A    4/1996
GB      482020 A    3/1938
(Continued)

OTHER PUBLICATIONS

International Search Report for related British Application No. PCT/GB2016/051885.
(Continued)

*Primary Examiner* — Darren W Gorman
(74) *Attorney, Agent, or Firm* — Miller, Matthias & Hull LLP

(57) ABSTRACT

The invention relates to a spray gun apparatus (10) for spraying a fine film coating of liquid, such as paint, lacquer or bond, onto a surface. The spray gun comprises a main body (12) having a fluid throughbore (22), a gas throughbore (16), and a main trigger lever (80) for allowing a user to spray fluid from the gun. A fluid flow adjustment mechanism (52, 58, 74) facilitates adjustment of the quantity of fluid sprayed from the gun for a given displacement of the main trigger lever (80). An engagement surface (86) is provided on the trigger lever and adapted to engage with a corresponding engagement surface (90) of the fluid flow adjustment mechanism. Pivoting movement of the main trigger lever (80) results in translational movement of at least a portion of the fluid flow adjustment mechanism to thereby selectively spray fluid from the gun upon displacement of the main trigger lever.

12 Claims, 3 Drawing Sheets

(51) Int. Cl.
  *B05B 7/12* (2006.01)
  *B05B 7/24* (2006.01)
(52) U.S. Cl.
  CPC .......... *B05B 7/1218* (2013.01); *B05B 7/1245* (2013.01); *B05B 7/2489* (2013.01)
(58) Field of Classification Search
  CPC ... B05B 7/1209; B05B 7/1218; B05B 7/1245; B05B 12/002
  USPC ........................................ 239/290, 296, 526
  See application file for complete search history.

(56) References Cited

U.S. PATENT DOCUMENTS

| | | | |
|---|---|---|---|
| 1,982,055 A | | 11/1934 | Jenkins |
| 1,982,056 A | | 11/1934 | Jenkins |
| 2,079,933 A | * | 5/1937 | Fisher ..................... B05B 7/066 239/340 |
| 2,504,117 A | | 4/1950 | Downs |
| 2,958,471 A | | 11/1960 | Zippel |
| 3,747,850 A | | 7/1973 | Hastings et al. |
| 4,702,420 A | | 10/1987 | Rath |
| 4,917,300 A | | 4/1990 | Gloviak et al. |
| 5,803,367 A | | 9/1998 | Heard et al. |
| 6,793,157 B1 | * | 9/2004 | Lindsay ................ B05B 7/0081 239/406 |
| 2005/0145718 A1 | | 7/2005 | Blette et al. |
| 2012/0097762 A1 | | 4/2012 | Gehrung et al. |

FOREIGN PATENT DOCUMENTS

| | | |
|---|---|---|
| GB | 508719 A | 7/1939 |
| GB | 2485566 A | 5/2012 |
| JP | 2001129444 A | 5/2001 |
| WO | 0024521 A2 | 5/2000 |
| WO | 0166261 A2 | 9/2001 |
| WO | 2011062752 A2 | 5/2011 |
| WO | 2012040887 A1 | 4/2012 |

OTHER PUBLICATIONS

Search Report for related British Application No. GB1511245.1; report dated Dec. 22, 2015.

* cited by examiner

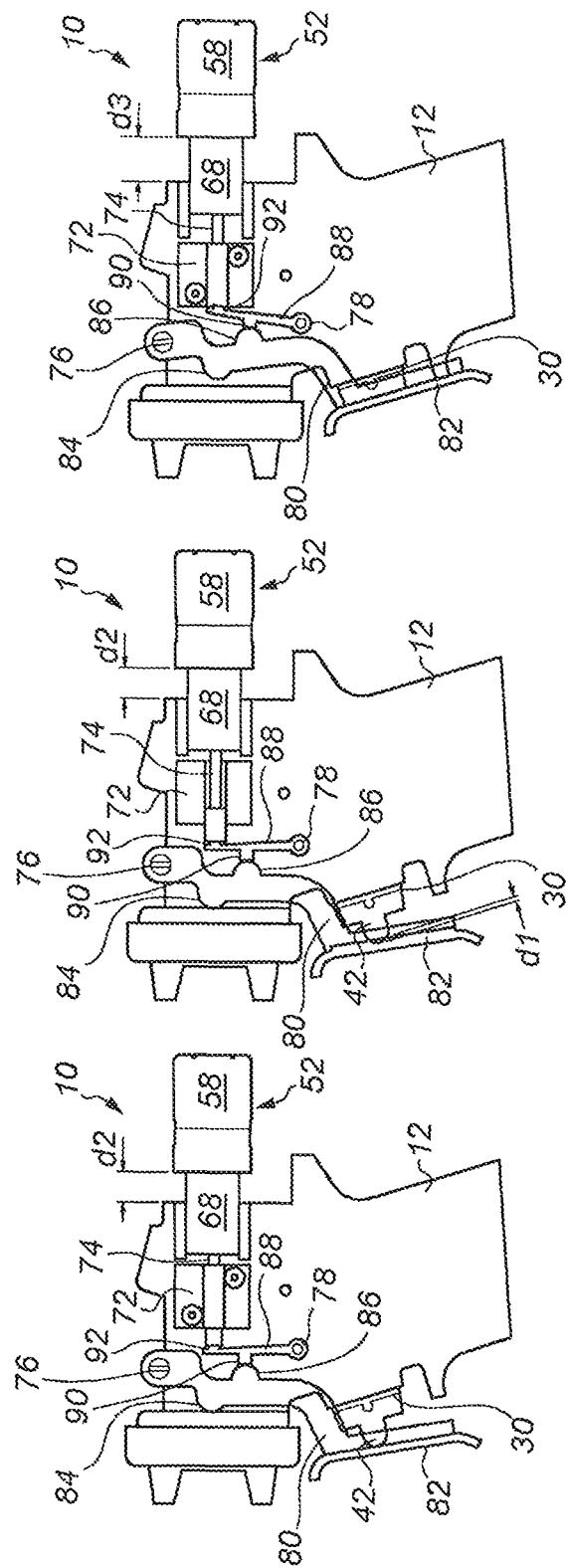

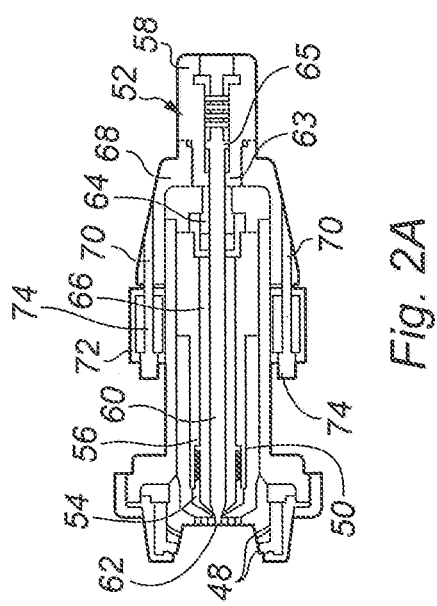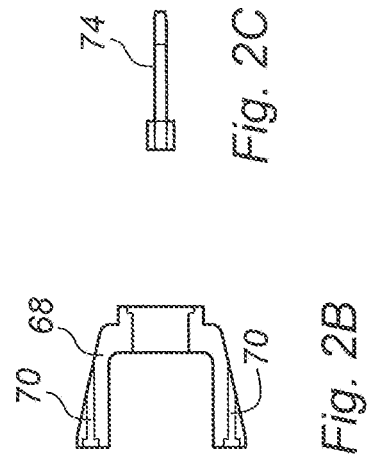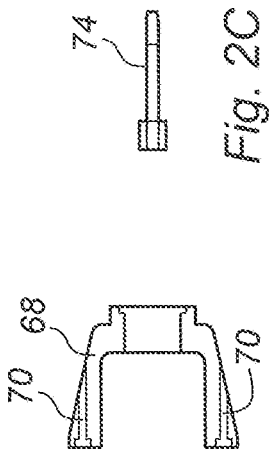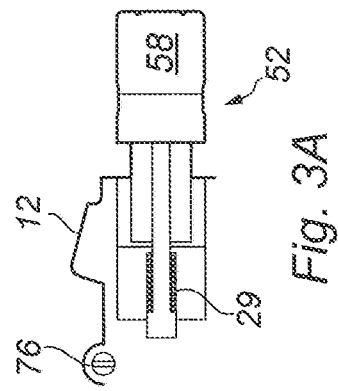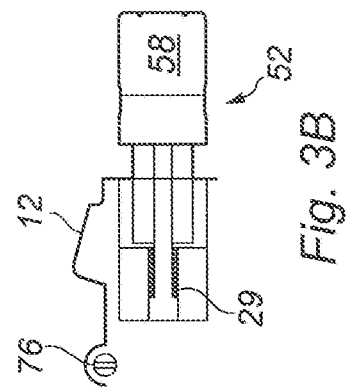

SPRAY GUN APPARATUS

FIELD OF THE DISCLOSURE

The present invention relates to spray gun apparatus, particularly, but not exclusively, spray gun apparatus for spraying a fine film coating of liquid, such as paint, lacquer or bond, onto a surface.

BACKGROUND OF THE DISCLOSURE

Spray guns are utilised in many applications in order to quickly and accurately apply paint, lacquer or bonding substances etc. to a surface. In many such applications, the quantity of paint or other substance applied to the surface, and hence the film thickness of the resulting coating must be extremely accurate. Examples of such applications include e.g. the automotive and aerospace industries.

An example of a known spray gun is described in Irish Patent Publication No. 120249 which describes a spray gun having a reciprocating trigger which, when pressed by a user, translates a paint release needle into an open position in order to release paint from the gun in a controlled fashion. The reciprocating trigger also simultaneously actuates an air valve in order to release a first flow of air which ejects paint from the apparatus as a jet, and a second ("horns") flow of air which is imparted tangentially on the jet of paint as it leaves the apparatus in order to shape the jet of paint into a fan shape.

One problem with such known spray guns is that, over a short period of time, wear and tear of the reciprocal trigger mechanism can cause misalignment between the trigger, air valve and paint release assembly. Such misalignment causes inaccuracies in the quantity of paint sprayed for a given displacement of the trigger and hence causes inaccuracies in the film thickness of paint applied. Furthermore, the trigger in such spray guns has a tendency to become jammed (especially in the "on" position) due to mechanical play arising in the interaction between the components of the trigger and the paint release assembly against the spray gun's main body.

SUMMARY OF THE DISCLOSURE

According to a first aspect of the present invention there is provided spray gun apparatus comprising:
  a main body having at least a fluid throughbore and at least a gas throughbore which together allow fluid to be sprayed from the gun;
  a main trigger lever for allowing a user to spray fluid from the gun by selective displacement of the trigger lever; and
  a fluid flow adjustment mechanism for allowing a user to adjust the quantity of fluid sprayed from the gun for a given displacement of the main trigger lever and wherein the main trigger lever is pivotably mounted to allow pivoting movement of the main trigger lever with respect to the main body when the main trigger lever is displaced by a user and wherein the main trigger lever is provided with an engagement surface adapted to engage with a corresponding engagement surface of the fluid flow adjustment mechanism in order that pivoting movement of the main trigger lever results in translational movement of at least a portion of the or each fluid flow adjustment mechanism to thereby selectively spray fluid from the gun upon displacement of the main trigger lever.

According to a second aspect of the present invention there is provided spray gun apparatus comprising;
  a main body;
  a propellant gas throughbore for passage of a propellant gas flow into a propellant annulus for spraying of a jet of fluid from the spray gun;
  a horn gas throughbore for passage of a horn gas flow into a horn annulus for controlling the characteristics of the jet of fluid sprayed from the spray gun, and wherein the apparatus further comprises a regulator valve in the body of the apparatus which allows the flow of gas in the horn gas throughbore, and hence the dimensions and characteristics of the jet of fluid sprayed from the gun to be adjusted.

Further features and advantages of the first and second aspects of the present invention will become apparent from the claims and the following description.

BRIEF DESCRIPTION OF THE DRAWINGS

Embodiments of the present invention will now be described by way of example only, with reference to the following diagrams, in which:

FIG. 1A is an illustration of an upper portion of the spray gun apparatus where the main trigger lever is in a rest configuration;

FIG. 1B is an illustration of the upper portion of the spray gun apparatus where the main trigger lever is in a partially open configuration such that the air valve mechanism is partially open and where no paint is released;

FIG. 1C is an illustration of the upper portion of the spray gun apparatus where the main trigger lever is in a fully open configuration;

FIG. 2A is a plan view of the apparatus shown in FIG. 1A;

FIG. 2B is a plan view of a side wing member in isolation;

FIG. 2C is a view of a paint release piston in isolation;

FIG. 3A is a partial cross sectional illustration of a fluid flow adjustment mechanism shown in a non-fluid dispensing configuration;

FIG. 3B is a partial cross sectional illustration of the fluid flow adjustment mechanism shown in a fluid dispensing configuration.

DETAILED DESCRIPTION

Figure 4:
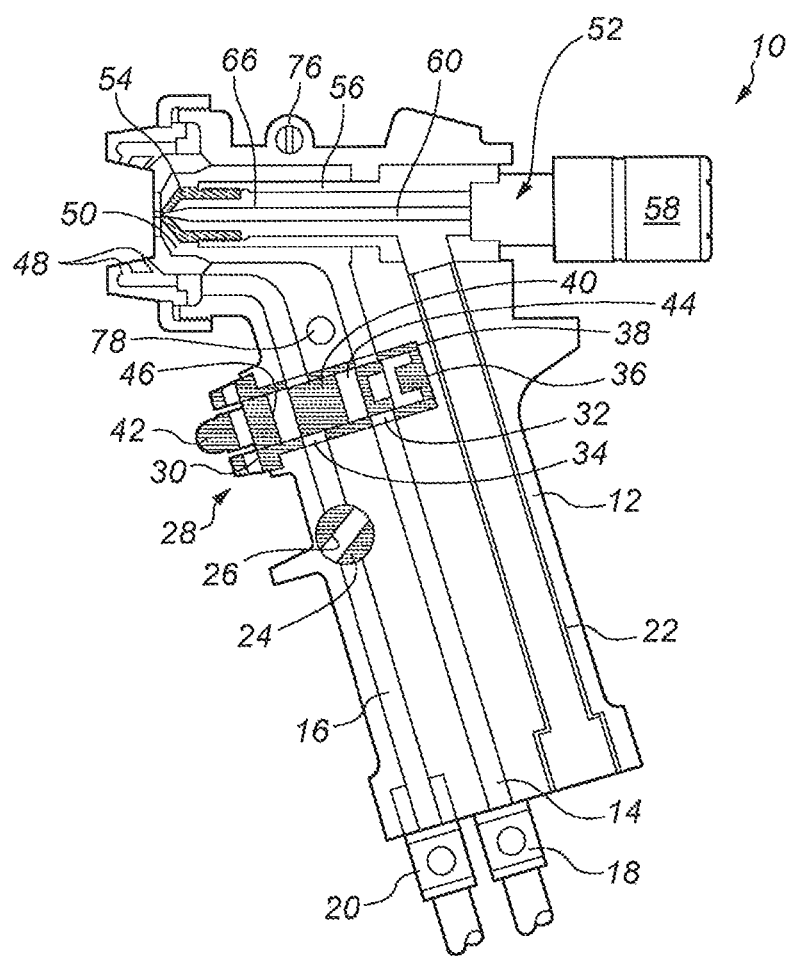
FIG. 4 is a partial cross sectional illustration of the spray gun apparatus where the lower portion of the spray gun apparatus is also illustrated and where a cylindrical regulator valve according to a second aspect of the invention is illustrated.

Referring to FIG. 4, spray gun apparatus 10 comprises a main body section 12 having a propellant air supply throughbore 14 and a horn air supply throughbore 16. A propellant air supply fitting 18 is provided toward the bottom of the throughbore 14 and a horn air supply fitting 20 is provided toward the bottom of the throughbore 16 in order to allow each throughbore to be independently connected to a flow of air from e.g. a compressor or other source. In the present embodiment, a fluid supply throughbore 22 is also provided to allow fluid, such as paint, to be introduced into the apparatus; however, this may alternatively be blanked off if the apparatus were to be supplied: with paint by way of e.g. a gravity feed cup.

The throughbore 16 is provided with a cylindrical regulator valve 24 having a release bore 26 therethrough. The body of the cylindrical valve 24 extends outside of the apparatus main body 12 in order to allow a user to manually rotate the valve during use of the apparatus as will be described subsequently.

An air valve arrangement 28 is located within the main body of the apparatus 10 and comprises a fixed housing 30 having a bore 32 in line with the throughbore 14 and a bore 34 in line with the throughbore 16. An end stop 36 is also provided with a coded spring 38 which retains an inner valve member 40 in the position illustrated in FIG. 4. The inner valve member 40 comprises a rounded nose section 42, a first release throughbore 44, and a second release throughbore 46, the purpose and operation of which will be described subsequently.

The upper section of the apparatus 10 comprises horn outlets 48 which are in fluid communication with the throughbore 16, and a propellant annulus 50 which is in fluid communication with the throughbore 14.

As best illustrated in FIG. 2A, a fluid release and adjustment mechanism, generally designated 52, is also provided in the upper main body. The mechanism 52 comprises a fluid nozzle 54 mounted to an end of a fluid transfer chamber 56 and which has a rotatable adjustment dial 58 projecting from the other end thereof. A fluid release needle 60 extends between the dial 58 and this selectively opens and closes a fluid release aperture 62 at the end of the fluid nozzle 54. A fluid seal arrangement 64 is provided in order to retain fluid (fed from the fluid throughbore 22 or from a gravity cup (not shown)) within the annulus 66 between the needle 60 and the walls of the fluid transfer chamber 56.

The dial 58 is threadedly engaged with a pair of side wings 68. Each wing of the side wings 68 is provided with a piston securing bore 70 which are each aligned with a piston guide cylinder 72 and associated piston 74 on either side of the apparatus 10.

As illustrated in FIG. 4, the main body 12 is also provided with a main lever pivot point 76 and an intermediate lever pivot point 78.

Referring now to FIGS. 1A, 1B and 1C, a main trigger lever 80 is mounted on the main lever pivot point 76. The lever 80 comprises a finger pad 82 which is sized and shaped to comfortably accommodate the user's forefingers, a semi-circular front stop protrusion 84 and an opposing semi-circular protrusion 86.

An intermediate lever 88 is mounted on the intermediate lever pivot point 78. The intermediate lever 88 comprises a square edged engagement protrusion 90 and an opposing semi-circular engagement protrusion 92. Such an intermediate lever is provided on both sides of the apparatus.

As illustrated in FIGS. 1A to 1C, the protrusion 86 of the main lever 80 is dimensioned and positioned relative to the protrusions 90, 92 of the intermediate lever 88 such that the end protrusion 92 of the intermediate levers 88 abut against the ends of the piston members 74 at either side of the apparatus 10.

In use, when a user wishes to spray fluid, such as paint, from the gun, he starts with the apparatus in the rest configuration shown in FIG. 1A. In this configuration, the rear surface of the main lever finger pad 82 abuts directly against the nose 42 of the air valve arrangement 28; however, a small gap is provided between the rear surface of protrusion 86 and the front surface of protrusion 90 of the intermediate lever.

In order to begin spraying, the user then grasps the apparatus 10 in his hand and begins to displace or "squeeze" the trigger towards the main body 12. In doing so, the user progresses the apparatus 10 from the rest configuration illustrated in FIG. 1A to the intermediate configuration illustrated in FIG. 1B. This causes the nose 42 of the air valve arrangement 28 to move inwardly by a small amount (illustrated as d1 in FIG. 1B) which in turn causes the release bores 44, 46 of the air valve arrangement 28 to at least partially align with the main body throughbores 14, 16 such that, a small quantity of propellant air is allowed to flow into the annulus 50 and horn air out of the horn outlets 48. At this point, since the main trigger 80 has only been depressed by a small distance, the protrusion 86 simply abuts against the protrusion 90 of the intermediate lever 88; however, it does not pivot the intermediate lever 88 at all and hence does not move the fluid release and adjustment mechanism 52 at all. Therefore no fluid is sprayed from the apparatus 10 at this point. This alignment of components helps to prevent fluid from being released when there is no airflow, both on initial use of the apparatus and upon finishing each spraying operation. This is illustrated by the dimensions d2 both being the same in the rest configuration of FIG. 1A and the intermediate configuration of 1B.

During movement of the main lever 80 from the rest configuration of FIG. 1A to the intermediate configuration of FIG. 1B pivoting movement of the main lever member 80 is only resisted by the coiled spring 38 of the air valve arrangement 28.

As the user continues to bring the main trigger lever 80 towards the main body 12, the nose 42 of the air valve, arrangement 28 is progressed further into its fixed housing 30 such that its release bores 44, 46 fully align with the throughbores 14, 16 to allow a full flow of air into the propellant annulus 50 and out of the horn outlets 48. At the same time, such pivoting movement of the main lever 80 causes the intermediate levers 88 on either side of the apparatus 10 to pivot due to the interaction between the protrusion 86 of the main lever 80 and the protrusion 90 of the intermediate lever. This causes the end protrusion 92 of the intermediate lever to push the pistons 74 on either side of the apparatus 10 rearward which in turn moves the fluid release and adjustment mechanism 52 rearward. However, the needle 60 will only begin to open the aperture 62 when the collar 63 of the dial mechanism 58 abuts against the collar 65 of the needle 60. This position is illustrated in FIG. 1C by the dimension d3 being greater than the dimension d2 of FIG. 1B.

The user may then turn the dial 58 until the collar 63 of the dial 58 abuts against the collar 65 of the needle 60 and continued turning will begin to move the needle 60 rearwards thereby opening the fluid release aperture 62 and allowing fluid to be propelled from the apparatus 10 under the force of the propellant air in the at 66. Thus small rotations of the dial 58 allows for fine adjustment to the quantity of paint expelled from the apparatus.

During movement of the apparatus between the intermediate configuration of FIG. 1B and the spraying configuration of FIG. 1C, pivoting movement of the main lever 80 is resisted by both the coiled spring 38 of the air valve arrangement 28 and by the coiled spring 29 of the fluid release and adjustment mechanism 52.

During spraying, the user may adjust the quantity of fluid being released if desired by rotating the flow adjustment dial 58 which alters the translational position of the needle 60 with respect to the fluid outlet 62 and hence alters the gap therebetween.

In addition, the user may adjust the quantity of air being expelled from the horn outlets 48 before, during or after spraying in order to alter the "fan characteristics" of the spray jet. In order to achieve this, the user may rotate the cylindrical regulator valve 24 in order to present a greater or lesser cross section of its release bore 26 to the throughbore 16 and hence control the quantity of air flowing into the upper part of the throughbore 16. For example, if the user wishes no horn air flow (in order to spray a fine round spot of paint), the cylindrical valve 24 may be rotated such that the release bore 26 is entirely out of alignment with the throughbore 16 in order to prevent any air flowing through the throughbore 16. Alternatively, if the user wishes to spray a narrow, focused fan of paint the cylindrical valve 24 can be rotated such that only a small section of its release bore 26 is in alignment with the throughbore 16 in order to allow only a small quantity of air to flow into the upper part of the throughbore 16. Alternatively, if the user wishes to a spray a wide, dispersed fan of paint, the cylindrical valve 24 can be rotated such that all of its release bore 26 is in alignment with the throughbore 16 in order to allow a large quantity of air flow into the upper part of the throughbore 16.

When the user is finished spraying, he simply releases the main trigger lever 80. This will cause the main trigger lever 80 to be pushed back from the spraying configuration of FIG. 1C to the rest configuration of FIG. 1A, passing through the intermediate configuration of FIG. 1B.

Although particular embodiments of the invention have been disclosed her in detail, this has been done by way of example and for the purposes of illustration only. The aforementioned embodiments are not intended to be limiting with respect to the scope of the appended claims.

It is contemplated by the inventors that various substitutions, alterations, and modifications may be made to the invention without departing from the spirit and scope of the invention as defined by the claims. Examples of these include the following:

In an alternative arrangement, the propellant air supply throughbore 14 and the horn air supply throughbore 16 may comprise a single regulated air flow supply where the regulator would proportion the variable flow rate then split the airflow to the relevant throughbore 14, 16 which would allow a user to conveniently use a single regulated air flow source. The dimensions of the throughbores and/or valves may be designed to create a fixed or variable relationship between the two resulting flows of air as desired.

The invention claimed is:

1. Spray gun apparatus comprising:
    a main body having a fluid chamber;
    a fluid bore for passage therethrough of a fluid flow originating from a fluid source to the fluid chamber;
    a fluid-flow needle provided within the fluid chamber and operable to selectively open and close a fluid nozzle;
    a propellant gas bore for passage therethrough of a propellant gas flow originating from a gas source to a propellant annulus proximate the fluid nozzle;
    a horn gas bore for passage therethrough of a horn gas flow originating from a gas source to a horn annulus proximate the fluid nozzle;
    a gas valve provided in each of the propellant gas bore and the horn gas bore; and
    a main trigger lever pivotably connected to the main body;
    wherein displacement of the main trigger lever beyond a first threshold opens each of the gas valves to permit horn and/or propellant gas flows to exit from the spray gun, and wherein further displacement of the main trigger lever beyond a second, higher threshold also opens the fluid nozzle to permit fluid to exit from the spray gun.

2. Spray gun apparatus according to claim 1, wherein an end portion located distal to the fluid nozzle is translatable back and forth relative to the main body along the direction of the fluid-flow-needle to execute a translational movement.

3. Spray gun apparatus according to claim 2, wherein the main trigger lever comprises engagement surfaces which are indirectly engageable with the end portion to effect the translational movement.

4. Spray gun apparatus according to claim 3, wherein the engagement surfaces of the main trigger lever are engageable with a pair of pistons connected to, and movable with, the end portion.

5. Spray gun apparatus according to claim 4, wherein one piston is provided on one side of the main body and the other piston is provided on the other side of the main body.

6. Spray gun apparatus according to claim 4, wherein each piston is at least partially mounted within a cylindrical guide on respective opposite sides of the main body thereby to support the translational movement.

7. Spray gun apparatus according to claim 4, further comprising intermediate trigger levers pivotably connected to the main body and operable to transfer, via oppositely facing intermediate trigger level engagement surfaces, a displacement force imparted on the main trigger lever to each piston.

8. Spray gun apparatus according to claim 7, wherein the main trigger lever is secured to either side of the main body via respective pivot points, and wherein the intermediate trigger levers are pivotably connected to respective sides of the main body; and wherein pivotal displacement of the main trigger lever causes pivotal movement of the intermediate trigger levers such that, when the displacement of the main trigger lever exceeds the second threshold, translational movement of the respective piston members occurs.

9. Spray gun apparatus according to claim 7, wherein the main trigger lever is provided with:
    (i) front stop engagement surfaces which delimit the forward displacement of the main trigger lever; and
    (ii) oppositely directed engagement surfaces for engaging the intermediate trigger levers.

10. Spray gun apparatus according to claim 9, wherein each of the front stop engagement surfaces and the oppositely directed engagement surfaces of the main trigger lever comprise a substantially semi-circular protrusion.

11. Spray gun apparatus according to claim 10, wherein the intermediate trigger lever engagement surfaces which face the oppositely directed engagement surfaces of the main trigger lever comprise a square edged protrusion toward a longitudinal center thereof; and wherein the intermediate trigger lever engagement surfaces which each face one of said pair of pistons each comprises a protrusion towards an upper end thereof.

12. Spray gun apparatus according to claim 3, wherein the end portion is engageable with an actuation surface of the fluid-flow needle to selectively open the fluid nozzle.

* * * * *